United States Patent [19]

Coran et al.

[11] 4,310,638

[45] Jan. 12, 1982

[54] NYLON MODIFIED ACRYLIC COPOLYMER RUBBER

[75] Inventors: Aubert Y. Coran; Raman Patel, both of Akron, Ohio

[73] Assignee: Monsanto Company, St. Louis, Mo.

[21] Appl. No.: 179,921

[22] Filed: Aug. 20, 1980

[51] Int. Cl.³ .............................................. C08L 77/00
[52] U.S. Cl. ................................. 525/183; 260/30.8 R
[58] Field of Search .................... 525/183; 260/30.8 R

[56] References Cited

U.S. PATENT DOCUMENTS

| | | | |
|---|---|---|---|
| 2,214,405 | 9/1940 | Coffman | 260/30.8 R |
| 2,257,825 | 10/1941 | Vaala | 260/30.8 R |
| 3,626,026 | 12/1971 | Fukumura | 525/183 |
| 3,845,163 | 10/1974 | Murch | 260/857 |
| 4,086,295 | 4/1978 | Mori | 525/183 |
| 4,100,223 | 7/1978 | Meyer | 525/183 |
| 4,174,358 | 11/1979 | Epstein | 525/183 |

FOREIGN PATENT DOCUMENTS 2343693  3/1975  Fed. Rep. of Germany ...... 525/183

*Primary Examiner*—Paul Lieberman
*Attorney, Agent, or Firm*—Larry R. Swaney

[57] ABSTRACT

Thermoplastic elastomeric compositions are described comprising neutralized acrylic copolymer rubber reinforced by nylon.

12 Claims, No Drawings

NYLON MODIFIED ACRYLIC COPOLYMER RUBBER

This application relates to neutralized acid containing acrylic copolymer rubber compositions, and more particularly, to said compositions containing nylon intimately dispersed therewith.

BACKGROUND OF THE INVENTION

Thermoplastic nylon compositions toughened by the addition of metal ion neutralized acid containing acrylic copolymer rubber particles having a size in the range of 0.01 to 1 microns are known, U.S. Pat. No. 4,174,358. These tough compositions are useful for molded parts where high impact resistance is important, but they are not satisfactory for applications where elastomeric properties, for example, good compression set or tension sets, are needed.

Metal ion neutralized acid containing acrylic copolymer rubbers are thermoplastic elastomeric materials useful for molded parts exhibiting excellent compression set and tension set but they are not satisfactory for applications where high strength or good oil resistance are needed or, where high temperatures are encountered.

SUMMARY OF THE INVENTION

It has now been discovered that improved thermoplastic elastomeric (elastoplastic) compositions comprising neutralizing acid containing acrylic copolymer rubber are obtained by dispersing nylon therewith. The improved compositions are stronger and exhibit better oil resistance than similar compositions, but which contain no nylon. Surprisingly, the new compositions exhibit useful properties at temperatures well above the melting temperature of the nylon. The reason that the compositions have better properties, especially better high temperature properties is not understood, but it is believed to be because of bond formation between the acrylic copolymer rubber and the nylon.

Thus, an elastoplastic composition of the invention comprises a blend of nylon, in an amount up to 50 weight percent of the composition, and neutralized acid containing acrylic copolymer rubber, in an amount sufficient to impart rubberlike elasticity up to 98 weight percent of the composition, which composition is processable as a thermoplastic and is elastomeric. The composition can contain plasticizer for nylon or rubber. However, if the composition contains more nylon than rubber, sufficient plasticizer must be present to impart rubberlike elasticity to the composition. The minimum quantity of plasticizer is such that the total weight of rubber and plasticizer is equal to or greater than the weight of nylon in the composition. Compositions frequently contain plasticizer in an amount not exceeding the weight of the nylon. However, theremoplastic elastomeric compositions of the invention can be obtained without any plasticizer whatsoever so long as the amount of nylon does not exceed 50 weight percent of the composition. In compositions containing 50 weight percent or less of nylon, plasticizers optionally may be present but they are not required to obtain elastoplasticity unless the amount of nylon exceeds the amount of rubber.

Preferred compositions of the invention comprise neutralized acid containing acrylic copolymer rubber and about 2 to 50 parts by weight of nylon per 100 parts by weight of said rubber and nylon combined. More preferred compositions comprise metal ion neutralized acid containing acrylic copolymer rubber and about 10 to 40 parts by weight of nylon per 100 parts by weight of said rubber and nylon combined. The compositions may be prepared by melt mixing, preferably by mastication with the exclusion of air above the melting temperature of the nylon, neutralized acid containing acrylic copolymer rubber and nylon in the indicated proportions. Exclusion of air is especially beneficial when high melting nylon (200° C. or above) is used. A more preferred procedure comprises melt mixing the acid containing acrylic copolymer rubber and nylon until a homogeneous composition is obtained, then an acid polymer neutralizing agent, for example, a source of metal ion such as magnesium oxide or zinc oxide is added and mixing is continued until neutralization of the acid occurs. Interaction between the nylon and neutralized copolymer rubber can occur during melt mixing. Preferably, enough neutralizing agent is used to neutralize at least 50 percent of the acid. More preferably, the amount of neutralizing agent is sufficient to essentially completely neutralize all of the acid groups present in the rubber molecule. For examples of satisfactory metal ions, see Rees U.S. Pat. No. 3,264,272, issued Aug. 2, 1966, especially Columns 5 and 6, the disclosure of which is incorporated herein by reference.

Suitable acid containing acrylic copolymer rubbers comprise rubbery ethylenically unsaturated carboxylic acid-acrylic ester copolymers. The rubber of the invention must contain about 0.5-25 mole percent of acrylic acid or methacrylic acid. They are distinguished from polyacrylate rubbers which generally are essentially acrylic ester polymer. Suitable rubbers include acrylic acid-acrylic ester-alpha-olefin terpolymers which are essentially non-crystalline and have glass transition temperatures (Tg) below room temperature. The rubber may be prepared by partial hydrolysis of a polyacrylate rubber to obtain the required acid groups. Polyacrylate rubbers suitable for this purpose are described in Rubber World Blue Book, 1975 Edition, pages 399-400. Suitable copolymer rubbers are preferably prepared by polymerization of alkyl acrylate, acrylic acid or methacrylic acid and an alpha olefin of 2-8 carbon atoms. A preferred rubber is a polymer of ethylene, $C_1$-$C_4$ alkyl acrylate and acrylic acid. A more preferred acrylic acid rubber is a polymer comprising at least 50 mole percent of ethylene, about 0.5 to 10 mole percent acrylic acid and about 10 to 49.5 mole percent of alkyl acrylate.

Suitable nylons comprise thermoplastic crystalline or resinous high molecular weight solid polymers including homopolymers, copolymers and terpolymers having recurring amide units within the polymer chain. Both fiber-forming and molding grade nylons are satisfactory. Commercially available nylons may be advantageously used in the practice of the invention with nylons having a softening point or melting point between 160°-270° C. being preferred. Examples of suitable nylons are polycaprolactam, polylauryllactam, polyhexamethyleneadipamide, polyhexamethyleneazelamide, polyhexamethylenesebacamide, polyhexamethyleneisophthalamide, and their copolymers. Additional examples of suitable nylons are described in Encyclopedia of Polymer Science and Technology. Vol. 10, pages 392-414.

In the compositions of the invention, a sufficient amount of the acid groups of the rubber molecule are in the form of carboxylate salt groups which comprise at least 0.25 mole percent of the rubber monomer composition. A preferred neutralized acrylic copolymer rubber of the invention comprises about 1 to 5 weight percent of acrylic acid and about 0.5 to 4 parts by weight of metal oxide per 100 parts by weight of rubber.

One aspect of the invention comprises adding a plasticizer to the blend which plasticizer extends the range of proportions of nylon in the composition while still retaining elastoplasticity. For example, without plasticizer the weight of nylon cannot exceed the weight of rubber without losing rubberlike elasticity, whereas, with plasticizer, the weight of nylon may exceed the weight of rubber so long as the amount of nylon does not comprise more than 50 weight percent of the total composition. Generally, the quantity of plasticizer when present is 1–30 weight percent but it may comprise up to 65 percent of the total composition. Preferred plasticizers have low volatility, i.e., having a boiling point of at least 300° C. More preferred plasticizers have vapor pressures of less than 200 mm Hg, more preferably, less than 100 mm Hg, at 250° C. Suitable plasticizers are selected from the group consisting of phthalate plasticizers, adipate plasticizers, phosphate plasticizers, glycolate plasticizers, sulfonamide plasticizers, trimellitate plasticizers, epoxidized vegetable oil plasticizers and polymeric type permanent plasticizers. A preferred subclass of plasticizers are selected from the group consisting of epoxidized vegetable oil plasticizers and sulfonamide plasticizers.

Examples of suitable plasticizers are epoxidized soy bean oil or sunflower oil, dibutyl phthalate, dicyclohexyl phthalate, diethyl phthalate, diisodecyl phthalate, dimethyl phthalate, di(2-ethylhexyl) phthalate, diphenyl phthalate, diundecyl phthalate, mixed $C_7$–$C_{11}$ dialkyl phthalate, butyl benzyl phthalate, benzyl phthalate, di(2-ethylhexyl)adipate, mixed $C_7$–$C_9$ dialkyl adipate, tributoxyethyl phosphate, tributyl phosphate, tricresyl phosphate, triphenyl phosphate, cresyl diphenyl phosphate, 2-ethylhexyl diphenyl phosphate, isodecyl diphenyl phosphate, butyl phthalyl butyl glycolate, methyl phthalyl ethyl glycolate and mixed $C_7$–$C_9$ alkyl trimellitate. Sulfonamide plasticizers comprise a preferred class of plasticizers for nylons, for example, N-butyl benzylsulfonamide, N-cyclohexyl-p-toluenesulfonamide, o,p-toluenesulfonamide, N-ethyl-o,p-toluenesulfonamide and N-ethyl-o-toluenesulfonamide. For examples of other suitable plasticizers, refer to *Encyclopedia of Chemical Technology*, Vol. 10, Plasticizers, page 780–797.

The properties of the compositions of the invention may also be modifed by the addition of other ingredients which are conventional in the compounding of acrylic rubber or nylon. Examples of such ingredients include carbon black, silica, titanium dioxide, other pigments, clay, silanes, titanates or other coupling agents, stabilizers, antidegradants, processing aids, adhesives, tackifiers, wax, and discontinuous fibers such as wood cellulose or glass fibers, etc. The incorporation of particulate filler into the rubber, preferably prior to melt mixing or neutralization of the acid groups is particularly recommended. The particulate filler is generally masterbatched with the rubber which is then mixed with the nylon. Typical additions of particulate fillers or reinforcement fillers such as silica or carbon black comprise about 15–80 parts by weight of filler per 100 parts by weight of rubber. The amount of particulate filler which can be used depends, at least in part, upon the type of filler and the presence of other ingredients such as plasticizer.

Thermoplastic compositions of the invention are useful for making a variety of articles such as hoses, belts, gaskets, moldings and molded parts. They are particularly useful for making articles by extrusion, injection molding and compression molding techniques. Compositions of the invention are also especially useful for parts which are exposed to organic liquids and high temperatures.

Tensile properties of the compositions are determined by ASTM procedures D-1708-66 and D-638. Specimens are pulled with a tensile tester at 2.5 cm. per minute up to 30 percent elongation and 25.4 cm. per minute to failure. The term "elastomeric" as used herein and in the claims refers to rubberlike elasticity of a composition which possesses the property of forcibly retracting within ten minutes to less than 150% of its original length after being stretched at room temperature to twice its unstressed length and held for ten minutes before release (e.g. tension set is 50% or less). True stress at break (TSB) is the tensile strength at break multiplied by the extension ratio also at break, extension ratio being the length of a tensile test specimen at break divided by the original, unstressed length of the test specimen. Alternatively, extension ratio is 1.00 plus 1/100 of the percent ultimate elongation. Especially preferred compositions of the invention are rubber compositions having tension set values of about 50% or less. A more preferred composition additionally has a Shore D hardness of 50 or below or a Young's modulus below about 100 MPa.

DESCRIPTION OF THE PREFERRED EMBODIMENTS

Compositions illustrating the invention are prepared by charging nylon, acid containing acrylic copolymer rubber, and magnesium oxide in the indicated amounts (all parts by weight), into a Brabender mixer with cam rotors and an oil bath temperature of 225° C. The mixing speed is varied to maintain the stock temperature between 225°–235° C. A nitrogen purge is fed through the ram to minimize oxidative degradation. After the nylon is melted, the components are mixed for several minutes during which the mixing torque increases. The rotor speed is reduced to about 10 rpm for 2–3 minutes before the compositions are removed. Test specimens are prepared by compression molding at about 250° C. Properties of the molded sheet are then measured and recorded.

Materials used to illustrate the invention are as follows: acid containing acrylic copolymer rubber purchased under the tradename of Vamac believed to be a terpolymer of about 73 mole percent of ethylene, about 26 mole percent methyl methacrylate and about one mole percent of acrylic acid, nylon 6,66, a copolymer of caprolactam, hexamethylenediamine and adipic acid, m.p. 213° C., nylon 6, a homopolymer of caprolactam, m.p. 223° C., and various metal oxides and salts as identified in Table 3.

The effect of nylon/rubber proportions is shown in Table 1. The magnesium oxide level is held constant at 2 parts by weight per 100 parts by weight of rubber. The rubber is Vamac N-123 supplied in the form of a masterbatch of 100 parts of rubber and 23 parts of fumed silica, stabilizers and processing aids. For convenience, the amount of rubber and silica (plus stabilizers and processing aids) are shown separately in the tables.

The data show that incorporating nylon into the neutralized rubber results in improved properties including higher tensile strength, better (lower) oil swell and better (lower) compression set values.

Set properties and flow temperature of compositions of the invention are determined by measuring dimensional change of specimens subject to pressure at various temperatures. Each test specimen, in the form of a disk about 0.5 cm. diameter and about 2 mm thick, is pressed between two rigid heated plates separated by 30 mil. spacers. Samples are heated under pressure at temperatures between 125° and 300° C. at 25° C. intervals. After 5 minutes between the hot plates at 125° C., the specimens are removed, allowed to cool to room temperature, and the thickness measured. Set, C, (in %) is calculated for each specimen by the equation $C=[(t_o-t_i) \div (t_o-t_s)] \times 100$ where $t_o$ is the original specimen thickness, $t_i$ is the final specimen thickness after treatment, and $t_s$ is the thickness of the spacers. For each specimen, the process is repeated at 150° C., then at 175° C. etc. Testing with a particular specimen is discontinued after the set value C reaches 100%. The set values obtained at 125° C. are shown in Table 1. The data show that set decreases as the amount of nylon increases. Flow temperature is the temperature at which the set value is 100%. It is estimated from a plot of C against the temperature of pressing. The data show that the addition of nylon increases the flow temperature of the composition and that the flow temperature increases as the amount of nylon increases. Surprisingly, the flow temperature in compositions containing 10 or more parts of nylon is substantially higher than the melting point of nylon.

A composition of the invention comprising nylon 6 and a composition of the invention comprising carbon black are illustrated in Table 2. The compositions are prepared as described above. The rubber of Stock 1 is the same as in Table 1, but the nylon 6,66 has been replaced by nylon 6. The rubber of Stock 2 is Vamac N-124 supplied in the form of a masterbatch of 100 parts of rubber and 24 parts of carbon black, stabilizers and processing aids. The data show that both compositions exhibit improved properties.

TABLE 1

| | 1 | 2 | 3 | 4 | 5 | 6 | 7 | 8 | 9 |
|---|---|---|---|---|---|---|---|---|---|
| Acrylic Copolymer Rubber | 100 | 97.5 | 95 | 90 | 80 | 70 | 60 | 55 | 50 |
| Nylon 6,66 | 0 | 2.5 | 5 | 10 | 20 | 30 | 40 | 45 | 50 |
| Silica, Stabilizers & Processing Aids | 23 | 22.4 | 21.9 | 20.7 | 18.4 | 16.1 | 13.8 | 12.7 | 11.5 |
| MgO | 2.0 | 1.95 | 1.9 | 1.8 | 1.6 | 1.4 | 1.2 | 1.1 | 1.0 |
| Properties | | | | | | | | | |
| TS, MPa | 21.0 | 22.7 | 23.9 | 27.3 | 29.4 | 32.8 | 34.3 | 37.7 | 36.7 |
| $M_{100}$, MPa | 3.5 | 4.3 | 4.5 | 6.8 | 13.2 | 21.8 | 26.5 | 27.5 | 30.1 |
| E, MPa | 3.1 | 3.3 | 3.7 | 5.0 | 9.1 | 24 | 77 | 157 | 253 |
| Ult. Elong., % | 570 | 540 | 530 | 440 | 340 | 260 | 230 | 260 | 230 |
| Ten. Set, % | 5 | 5 | 5 | 5 | 10 | 15 | 29 | 46 | 50 |
| TSB, MPa | 140 | 145 | 151 | 147 | 129 | 119 | 114 | 137 | 120 |
| Oil Swell, wt. % | 86 | 81 | 78 | 65 | 57 | 43 | 28 | 24 | 17 |
| Set, % @ 125° C. | 85 | 78 | 82 | 78 | 74 | 75 | 70 | 65 | 63 |
| Flow Temp., °C. | 200 | 208 | 174 | 242 | 268 | 278 | 288 | 299 | >300 |

TABLE 2

| | 1 | 2 |
|---|---|---|
| Acrylic Copolymer Rubber | 70 | 70 |
| Nylon 6,66 | — | 30 |
| Nylon 6 | 30 | — |
| Carbon Black, Stabilizers & Processing Aids | — | 16.8 |
| Silica, Stabilizers & Processing Aids | 16.1 | — |
| MgO | 2.0 | 2.0 |
| Molding Temp., °C. | 300 | 300 |
| Properties | | |
| TS, MPa | 29.3 | 20.9 |
| $M_{100}$, MPa | 16.7 | 11.0 |
| E, MPa | 20.7 | 8.3 |
| Ult. Elong., % | 310 | 320 |
| Ten. Set, % | 20 | 10 |
| TSB, MPa | 120 | 87 |

TABLE 3

| | 1 | 2 | 3 | 4 | 5 | 6 | 7 | 8 | 9 | 10 | 11 | 12 |
|---|---|---|---|---|---|---|---|---|---|---|---|---|
| Base* | MgO | Mg.(Ac)$_2$ | ZnO | Zn.(Ac)$_2$ | Ca.(Ac)$_2$ | Na.Ac | Li.Ac | CaO | Ba.(Ac)$_2$ | Cu.(Ac)$_2$ | NaHCO$_3$ | none |
| Mixing time, min. | 5 | 12 | 12 | 16 | 10 | 7 | 12 | 5 | 28 | 28 | 6 | 28 |
| Properties | | | | | | | | | | | | |
| TS, MPa | 27.0 | 27.0 | 26.1 | 26.2 | 16.7 | 13.6 | 17.9 | 26.4 | 7.0 | 0.2 | 23.4 | 0.1 |
| $M_{100}$, MPa | 16.1 | 17.8 | 11.3 | 15.7 | 10.5 | 10.5 | 9.3 | 17.6 | 2.1 | 0.7 | 14.5 | 0.6 |
| E, MPa | 18.2 | 32.9 | 10.7 | 43.2 | 16.4 | 26.6 | 11.9 | 37.7 | 3.4 | 2.0 | 24.8 | 1.5 |
| Elong., % | 350 | 350 | 430 | 350 | 300 | 200 | 360 | 240 | 420 | 2010 | 320 | 3110 |
| Ten. Set, % | 17 | 30 | 15 | 34 | 15 | 19 | 19 | 20 | 9 | 49 | 20 | 49 |
| TSB, MPa | 121 | 120 | 137 | 118 | 67 | 41 | 82 | 90 | 36 | 4 | 98 | 2 |

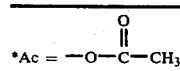

*Ac = —O—C(=O)—CH$_3$

The use of different metal ion sources for neutralizing the acrylic copolymer rubber is illustrated in Table 3. The procedure for preparing the compositions are the same as in Table 1. The time in minutes which the compositions are mixed after addition of the metal compound is shown in the table. All compositions contain 75 parts by weight of Vamac N-123 (61 parts by weight of rubber) and 25 parts by weight of nylon 6,66. One milliequivalent of metal oxide or metal salt is added per gram of rubber masterbatch. When the metal compound is added as a hydrate, the amount is adjusted to keep the equivalent concentration of metal ion per gram of rubber constant. Stock 12 is a control containing no metal ion source. The data also show that magnesium, zinc, calcium, sodium, lithium and barium ions are effective.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An elastoplastic composition comprising a blend of 98 to 60 parts by weight of neutralized acid containing acrylic copolymer rubber and about 2 to 40 parts by weight of nylon per 100 parts by weight of said rubber and nylon combined.

2. The composition of claim 1 comprising metal ion neutralized acid containing acrylic copolymer rubber and about 10 to 40 parts by weight percent of nylon per 100 parts by weight of said rubber and nylon combined.

3. The composition of claim 2 in which the rubber is a copolymer of ethylene, alkyl acrylate and unsaturated carboxylic acid.

4. The composition of claim 3 in which the rubber comprises at least 50 mole percent of ethylene, about 0.5 to 10 mole percent of acrylic or methacrylic acid, and up to about 49.5 mole percent of alkyl acrylate.

5. The composition of claim 4 in which the nylon melts at about 160°–250° C.

6. The composition of claim 5 in which the source of metal ion is a metal oxide.

7. The composition of claim 6 in which the rubber is neutralized with magnesium ion or zinc ion.

8. The composition of claim 7 comprising a copolymer rubber containing about 1 to 5 weight percent of acrylic acid and about 0.5 to 4 parts by weight of metal oxide per 100 parts by weight of rubber.

9. The composition of claim 8 in which the nylon is Nylon 6,66.

10. The composition of claim 8 in which the nylon is Nylon 6.

11. The composition of claim 9 in which the metal oxide is magnesium oxide.

12. The composition of claim 10 in which the metal oxide is magnesium oxide.

* * * * *